US011875692B2

(12) United States Patent
He et al.

(10) Patent No.: US 11,875,692 B2
(45) Date of Patent: Jan. 16, 2024

(54) SYSTEMS AND METHODS FOR DISPLAYING COMBINED RUNWAY OVERRUN AWARENESS ALERTING SYSTEM (ROAAS) AND SURFACE INDICATIONS ALERTS (SURFIA) TRAFFIC SYMBOLOGY (71) Applicant: HONEYWELL INTERNATIONAL INC., Charlotte, NC (US)

(72) Inventors: Gang He, Morris Plains, NJ (US); Thea Feyereisen, Minneapolis, MN (US); Zhihao Qin, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 272 days.

(21) Appl. No.: 17/236,259

(22) Filed: Apr. 21, 2021

(65) Prior Publication Data
US 2022/0343777 A1    Oct. 27, 2022

(51) Int. Cl.
*G08G 5/00*    (2006.01)
*G08G 5/02*    (2006.01)
*G01C 23/00*    (2006.01)
*G06T 11/60*    (2006.01)

(52) U.S. Cl.
CPC .............. *G08G 5/02* (2013.01); *G01C 23/005* (2013.01); *G06T 11/60* (2013.01); *G06T 2200/24* (2013.01); *G06T 2210/61* (2013.01)

(58) Field of Classification Search
CPC ...... G08G 5/02; G08G 5/0008; G08G 5/0021; G08G 5/025; G08G 5/065; G08G 5/0013; G01C 23/005; G06T 11/60; G06T 2200/24; G06T 2210/61

USPC ......................................................... 340/947
See application file for complete search history.

(56) References Cited

U.S. PATENT DOCUMENTS

| | | | |
|---|---|---|---|
| 6,694,249 B1 | 2/2004 | Anderson et al. | |
| 6,957,130 B1 | 10/2005 | Horvath et al. | |
| 7,564,372 B1 | 7/2009 | Bailey et al. | |
| 8,774,989 B1* | 7/2014 | Bush ...................... | B64D 43/02 701/16 |
| 9,852,643 B1* | 12/2017 | Borgyos ............. | H04B 7/18506 |
| 2008/0275642 A1 | 11/2008 | Clark et al. | |
| 2011/0246003 A1* | 10/2011 | Lafon .................... | G08G 5/025 701/16 |
| 2013/0113819 A1 | 5/2013 | Gurusamy | |
| 2014/0249737 A1 | 9/2014 | Meunier et al. | |

(Continued)

*Primary Examiner* — Tai T Nguyen
(74) *Attorney, Agent, or Firm* — Lorenz & Kopf LLP (57) ABSTRACT Methods and systems for providing landing area information on an active avionic display on a display device in a cockpit of an aircraft. The system includes an avionic display module configured to render an avionic display on a display device; and a landing area guidance module configured to: construct a graphical insert that is smaller than the avionic display, the graphical insert depicting the landing area environment as a two-dimensional area that includes a landing location rendered therein in a first visualization scheme; overlay the graphical insert on a small portion of the avionic display; indicate a target exit on the landing location; determine whether a runway overrun awareness alerting system (ROAAS) alert has been received; determine whether a surface indication alerts (SurfIA) alert has been received; responsive to the ROAAS alert and the SurfIA alert, alter the rendering within the graphical insert.

20 Claims, 5 Drawing Sheets

(56) References Cited

U.S. PATENT DOCUMENTS

| | | | |
|---|---|---|---|
| 2015/0084793 A1 | 3/2015 | Khatwa et al. | |
| 2015/0261379 A1* | 9/2015 | Kneuper | B64D 43/00 |
| | | | 345/173 |
| 2016/0063869 A1 | 3/2016 | Kathirvel et al. | |
| 2016/0090193 A1 | 3/2016 | He et al. | |
| 2016/0107766 A1 | 4/2016 | He et al. | |
| 2016/0152348 A1* | 6/2016 | Mohideen | G01C 23/005 |
| | | | 701/16 |
| 2018/0127111 A1 | 5/2018 | Feyereisen et al. | |
| 2018/0281988 A1* | 10/2018 | Tellechea | G08G 5/025 |
| 2018/0301045 A1* | 10/2018 | Pesik | B64F 1/002 |
| 2021/0390870 A1* | 12/2021 | Subramaniyan | B64F 1/18 |

* cited by examiner

SYSTEMS AND METHODS FOR DISPLAYING COMBINED RUNWAY OVERRUN AWARENESS ALERTING SYSTEM (ROAAS) AND SURFACE INDICATIONS ALERTS (SURFIA) TRAFFIC SYMBOLOGY

TECHNICAL FIELD

The following disclosure relates generally to systems and methods that provide landing area information, and, more particularly, to systems and methods for displaying combined runway overrun awareness alerting system (ROAAS) and surface indications alerts (SURFIA) traffic symbology for an aircraft.

BACKGROUND

A final approach landing operation is a high workload environment in which a pilot must process many pieces of information. During landing operations, the pilot and crew generally rely on an active map display in a cockpit of an aircraft to present some combination of a flight plan, missed approach information, information about surrounding traffic, weather radar data, and the like. The active map display is usually a lateral display (also called a navigation display). Often, for a final approach landing operation, conventional flight guidance systems center the navigation display at the aircraft's current location. As such, the scale and the provided view of the navigation display presents a technical challenge because it is most likely not optimal for flight crews to quickly understand landing performance and runway occupancy conditions, such as potential traffic onto the landing runway.

Accordingly, systems and methods that provide technologically improved landing area information on an active map display in a cockpit of an aircraft are desirable. Furthermore, other desirable features and characteristics of the present invention will be apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a system for providing landing area information on an active display on a display device in a cockpit of an aircraft, the system including: a source of a landing area environment; a source of runway overrun awareness alerting system (ROAAS) elements and ROAAS alerts; a source of surface indication alerts (SurfIA) elements and SurfIA alerts; a source of traffic data; and a controller circuit configured to receive the ROAAS elements and alerts, the SurfIA elements and alerts, the landing area environment, and the traffic data, the controller circuit configured by programming instructions to: identify a landing location; construct a graphical insert that depicts the landing area environment as a two-dimensional area that includes the landing location rendered therein in a first visualization scheme; overlay the graphical insert on a predefined portion of the active display; indicate a target exit on the landing location; responsive to a ROAAS alert, (i) alter the rendering of the landing location to a second visualization scheme that is visually distinguishable from the first visualization scheme, and (ii) render respective ROAAS elements on the landing location within the landing area environment; and responsive to a SurfIA alert, indicate traffic symbols in a third visualization scheme associated with a traffic in the SurfIA alert on the landing area environment.

Also provided is a method for providing landing area information on an avionic display on a display device in a cockpit of an aircraft. The method including: at a controller circuit, receiving ownship data; displaying an avionic display on a display device; identifying a landing location; constructing a graphical insert that depicts a landing area environment as a two-dimensional area that includes the landing location rendered therein in a first visualization scheme; overlaying the graphical insert on the avionic display; indicating a target exit on the landing location; determining whether a runway overrun awareness alerting system (ROAAS) alert has been received; determining whether a surface indication alerts (SurfIA) alert has been received; responsive to the ROAAS alert, altering the rendering of the landing location and displaying ROAAS elements; and responsive to the SurfIA alert, indicating a traffic associated with the SurfIA alert using SurfIA visualization rules.

Another system for providing landing area information on an avionic display on a display device in a cockpit of an aircraft is provided. The system including: an avionic display module configured by programming instructions to render an avionic display on a display device; and a landing area guidance module configured by programming instructions to: construct a graphical insert that is smaller than the avionic display, the graphical insert depicting the landing area environment as a two-dimensional area that includes a landing location rendered therein in a first visualization scheme; overlay the graphical insert on a predefined portion of the avionic display; indicate a target exit on the landing location; determine whether a runway overrun awareness alerting system (ROAAS) alert has been received; determine whether a surface indication alerts (SurfIA) alert has been received; responsive to the ROAAS alert, alter the rendering of the landing location and display ROAAS elements; and responsive to the SurfIA alert, indicate a traffic associated with the SurfIA alert using SurfIA visualization rules.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect. As further appearing herein, the term "pilot" encompasses all users of the below-described aircraft system.

As mentioned, during highly cognitively demanding landing operations, the pilot and crew generally rely on an active map display in the cockpit of the aircraft to present some combination of a flight plan, missed approach information, information about surrounding traffic, weather radar data, and the like. In many available flight display systems, during a final approach landing operation, the available landing environment information is an active map display (a navigation display) that is centered at the aircraft's current location, referred to as a landing display. This landing display presents technical challenges because the scale and the provided view of the navigation display are generally not optimal for flight crews to quickly understand landing performance and runway occupancy conditions, such as potential traffic onto the landing runway.

Embodiments described herein present a solution to the technical challenges described above in the form of systems and methods providing landing area information on an active map display (also referred to as "active display" herein) on a display device in a cockpit of an aircraft. The present disclosure provides landing area information in the form of an easily comprehensible graphic insert having combined symbology from the runway overrun awareness alerting system (ROAAS) and surface indications alerts (SURFIA) for traffic.

Figure 1:
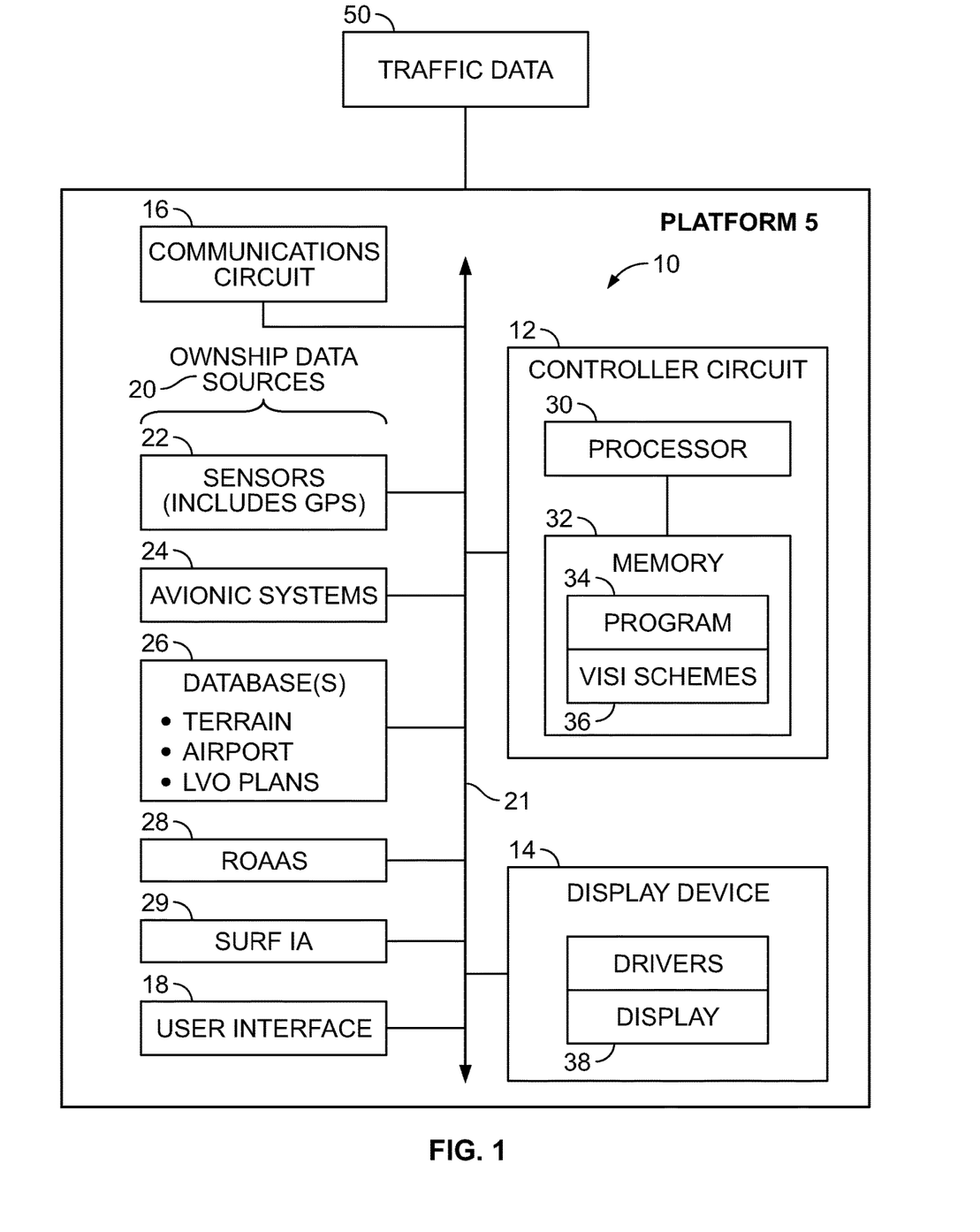
FIG. 1 is a block diagram of a system for providing landing area information on an active map display on a display device in a cockpit of an aircraft, as illustrated in accordance with an exemplary embodiment of the present disclosure.

FIG. 1 is a block diagram of a system 10 for providing combined landing area information on an active map display on a display device in a cockpit of an aircraft (shortened herein to "system" 10), in accordance with an exemplary and non-limiting embodiment of the present disclosure. The system 10 may be utilized onboard a mobile platform 5 to provide enhanced landing area information, as described herein. In various embodiments, the mobile platform is an aircraft 5, which carries or is equipped with the system 10. As schematically depicted in FIG. 1, system 10 includes the following components or subsystems, each of which may assume the form of a single device or multiple interconnected devices: a controller circuit 12 operationally coupled to: at least one display device 14; a communications circuit 16; a user interface 18, and one or more ownship data sources 20. In various embodiments, the controller circuit 12 communicates with the other components of the system 10 via a communication bus 21.

The display device 14 can include any number and type of image generating devices on which one or more avionic displays 38 may be produced. The display device 14 may embody a touch screen display. When the system 10 is utilized for a manned Aircraft, display device 14 may be affixed to the static structure of the Aircraft cockpit as, for example, a Head Down Display (HDD) or Head Up Display (HUD) unit. Alternatively, display device 14 may assume the form of a movable display device (e.g., a pilot-worn display device) or a portable display device, such as an Electronic Flight Bag (EFB), a laptop, or a tablet computer carried into the Aircraft cockpit by a pilot.

The communications circuit 16 generally includes an antenna, which may wirelessly transmit data to and receive real-time data and signals from various external sources, including, each of: a source of traffic data 50, air traffic control (ATC), ILS antennas (glide slope and localizer), ground stations, weather service source, and the like.

The user interface 18 may include any combination of a keyboard, cursor control device, voice input device, gesture input apparatus, or the like. The user interface may include any of: a graphical user interface (GUI), a speech recognition system, and a gesture recognition system.

The ownship data sources 20 generally include an array of flight parameter and geographic positioning system (GPS) sensors 22, onboard avionic systems 24, and a database 26. The ownship data sources may include a flight management system (FMS) 28. The ownship data sources 20 are further described below.

Flight parameter and GPS sensors 22 supply various types of data or measurements to controller circuit 12 during Aircraft flight. In various embodiments, the sensors 22 supply, without limitation, one or more of: inertial reference system measurements providing a location, Flight Path Angle (FPA) measurements, airspeed data, groundspeed data (including groundspeed direction), vertical speed data, vertical acceleration data, altitude data, attitude data including pitch data and roll measurements, yaw data, heading information, sensed atmospheric conditions data (including wind speed and direction data), flight path data, flight track data, radar altitude data, and geometric altitude data.

Onboard avionic systems 24 provide feedback and control for the engine and flight configuration equipment.

In practice, the database 26 may be realized as one or more different onboard databases, each being a computer-readable storage media or memory. In various embodiments, two- or three-dimensional map data may be stored in a database 26, including airport features data, geographical (terrain), buildings, bridges, and other structures, street maps, and navigational databases, which may be updated on a periodic or iterative basis to ensure data timeliness. This map data may be uploaded into the database 26 at an initialization step and then periodically updated, as directed by either a program 34 update or by an externally triggered update.

Embodiments described in more detail below refer to a landing location (which, in many cases, is a runway), a landing area environment, and a target exit. As may be appreciated, the landing area environment is an area surrounding the landing location. The landing area environment may include part of an airport with indications of intersecting runways and taxiways to the landing location. In various embodiments, therefore, the database 26 may be a source of the landing location, the landing area environment, and the target exit, described in more detail below.

In some embodiments, the source of any of: the landing location, the landing environment, and the target exit, is user input via the user interface 18.

In some embodiments, the controller circuit 12 identifies the landing location via shared communications over the communication bus 21, such as, a flight plan shared by a flight management system (FMS), and then references the airport features data to obtain data (such as dimensions, markings, orientation, etc.) for the identified landing location. In other embodiments, the target exit may be provided via shared communications over the communication bus 21, such as, a flight plan shared by a flight management system (FMS).

ROAAS 28 is a source of runway overrun awareness alerting system (ROAAS) elements and ROAAS alerts. As used herein, the ROAAS elements include symbology, such as, but not limited to: a donut to show a stopping point for the aircraft as a function of current deceleration, a runway identifier, a distance remaining, and a runway threshold. The ROAAS alerts are types of alerts, and include, for example, green for all stopping points being within safe confinement of a landing runway; cyan/white for some stopping points exceeding the runway length; amber for stopping points not attainable without corrective action; and red for stopping points not attainable and a go-around is required.

SurfIA 29 is a source of surface indication alerts (SurfIA) elements and SurfIA alerts. SurfIA gives pilots information about approaching hazards on a runway. Similar to ROAAS, SurfIA elements are the symbols used on the active map display, and SurfIA alerts are a type of alert with warning levels requiring immediate pilot actions.

The specific elements and alerts of ROAAS and SurfIA are not the subject of the present invention, as they are already known to persons with skill in the art. The provided apparatus and methods build on these systems by constructing a graphical insert for the avionic display 38 that combines ROAAS landing performance data and relevant runway traffic information from SurfIA, beneficially providing an improved human-machine interface, in the form of easily comprehensible landing information (as well as approach and takeoff guidance) that is grounded in a common runway context for rapid situation awareness.

Although schematically illustrated in FIG. 1 as a single unit, the individual elements and components of the system 10 can be implemented in a distributed manner utilizing any practical number of physically distinct and operatively interconnected pieces of hardware or equipment. When the system 10 is utilized as described herein, the various components of the system 10 will typically all be located onboard the Aircraft 5. In various embodiments, the system 10 may be separate from or integrated within: a flight management system (FMS) and/or a flight control system (FCS).

The term "controller circuit," as appearing herein, broadly encompasses those components utilized to carry-out or otherwise support the processing functionalities of the system 10. Accordingly, controller circuit 12 can be implemented as a programmable logic array, application specific integrated circuit, system on a chip (SOC), or other similar firmware, as well as by a combination of any number of individual processors, flight control computers, navigational equipment pieces, computer-readable storage devices (including or in addition to memory 32), power supplies, storage devices, interface cards, and other standardized components.

In various embodiments, as depicted in FIG. 1, the controller circuit 12 embodies an enhanced computer system, having one or more processors 30 operationally coupled to computer-readable storage media or memory 32, having stored therein at least one novel firmware or software program 34 (generally, computer-readable instructions that embody an algorithm) for carrying-out the various process tasks, calculations, and control/display functions described herein. During operation, the controller circuit 12 may be programmed with and execute the at least one firmware or software program, for example, program 34, that embodies an algorithm for receiving, processing, calculating, overlaying, and altering renderings, described herein, to thereby perform the various process steps, tasks, calculations, and control/display functions described herein.

Controller circuit 12 may exchange data, including real-time wireless data, with one or more external sources, such as the source of traffic data 50 to support operation of the system 10 in embodiments. In this case, the controller circuit 12 may utilize the communications circuit 16 to manage bidirectional wireless data exchange over a communications network, such as a public or private network implemented in accordance with Transmission Control Protocol/Internet Protocol architectures or other conventional protocol standards. Encryption and mutual authentication techniques may be applied, as appropriate, to ensure data security. In various embodiments, the communications circuit 16 is integrated within the controller circuit 12.

In some embodiments, the source of traffic data 50 is an automatic-dependent surveillance broadcast (ADS-B) system. In some embodiments, the source of traffic data 50 is a ground-based traffic broadcasting system. In yet other embodiments, the source of traffic data is an automatic-dependent surveillance broadcast (ADS-B) system and a ground-based traffic broadcasting system.

Memory 32 is a data storage that can encompass any number and type of storage media suitable for storing computer-readable code or instructions, such as the aforementioned software program 34, as well as other data generally supporting the operation of the system 10. Memory 32 may also store and be the source of one or more preprogrammed visualization schemes 36, for use by the algorithm embodied in software program 34. The visualization schemes 36 include rules for presenting surface indication alerts (SurfIA) elements and SurfIA alerts, and for presenting runway overrun awareness alerting system (ROAAS) elements and ROAAS alerts, as described above.

Specific to these embodiments, the program 34 plus visualization schemes 36 include rules for constructing a graphical insert that depicts the landing area environment as a two-dimensional area that includes the landing location rendered therein in a first visualization scheme; rules for altering the rendering of the landing location to a second visualization scheme, responsive to a ROAAS alert, the second visualization scheme being visually distinguishable from the first visualization scheme, and rendering respective ROAAS elements on the landing location within the landing area environment; and, rules for, responsive to a SurfIA alert, indicating traffic symbols in a third visualization scheme associated with a traffic in the SurfIA alert on the landing area environment. In summary, the program 34 plus visualization schemes 36 provide rules for combining ROAAS and SurfIA elements and alerts into this graphical insert, and rules to indicate, in this graphical insert, priorities among the combined ROAAS and SurfIA alerts.

The visualization schemes include symbology and methods for distinguishing features, such as, using a highlight color, a highlight box, a jagged boundary, or a bright color that is not otherwise used by existing elements in the active map display. In cases in which black and white displays or mono color are relied upon, the visually distinguishing techniques may include changing line thicknesses and/or using dashed/dotted lines. It is noted that 2D landing environment area for placing the combined symbology elements is a preferred way, a 3D orthographic or perspective representation may also be used.

In certain embodiments of system 10, the controller circuit 12 and the other components of the system 10 may be integrated within or cooperate with any number and type of systems commonly deployed onboard an aircraft including, for example, an FMS, an Attitude Heading Reference System (AHRS), an Instrument Landing System (ILS), and/or an Inertial Reference System (IRS).

With continued reference to FIG. 1, the display device 14 includes the necessary display drivers to generate at least one avionic display 38 during operation of the system 10; the term "avionic display" defined as synonymous with the term "aircraft-related display" and "cockpit display" and encompasses displays generated in textual, graphical, cartographical, and other formats. In various embodiments, the avionic display 38 is a primary flight display (PFD) or a navigation display. In various embodiments, the avionic display 38 can be, or include, any of various types of lateral displays and vertical situation displays on which map views and symbology, text annunciations, and other graphics pertaining to flight planning are presented for a pilot to view. The avionic display 38 generated and controlled by the system 10 can include graphical user interface (GUI) objects and alphanumerical input displays of the type commonly presented on the screens of MCDUs, as well as Control Display Units (CDUs) generally. Specifically, embodiments of avionic displays 38 include one or more two dimensional (2D) avionic displays, such as a horizontal (i.e., lateral) navigation display or vertical navigation display; and/or on one or more three dimensional (3D) avionic displays, such as a Primary Flight Display (PFD) or an exocentric 3D avionic display. With respect to the present disclosure, the avionic display includes an active map display with at least a continuously updated navigation display 38 showing the aircraft 5 at its current location and trajectory within the relevant map data, e.g., a landing environment or an airport moving map (AMM).

In various embodiments, a human-machine interface, such as the above described touch screen display, is implemented as an integration of the user interface 18 and a display device 14. Via various display and graphics systems processes, the controller circuit 12 may command and control the touch screen display generating a variety of graphical user interface (GUI) objects or elements described herein, including, for example, buttons, sliders, and the like, which are used to prompt a user to interact with the human-machine interface to provide user input, and to activate respective functions and provide user feedback, responsive to received user input at the GUI element.

Figure 2:
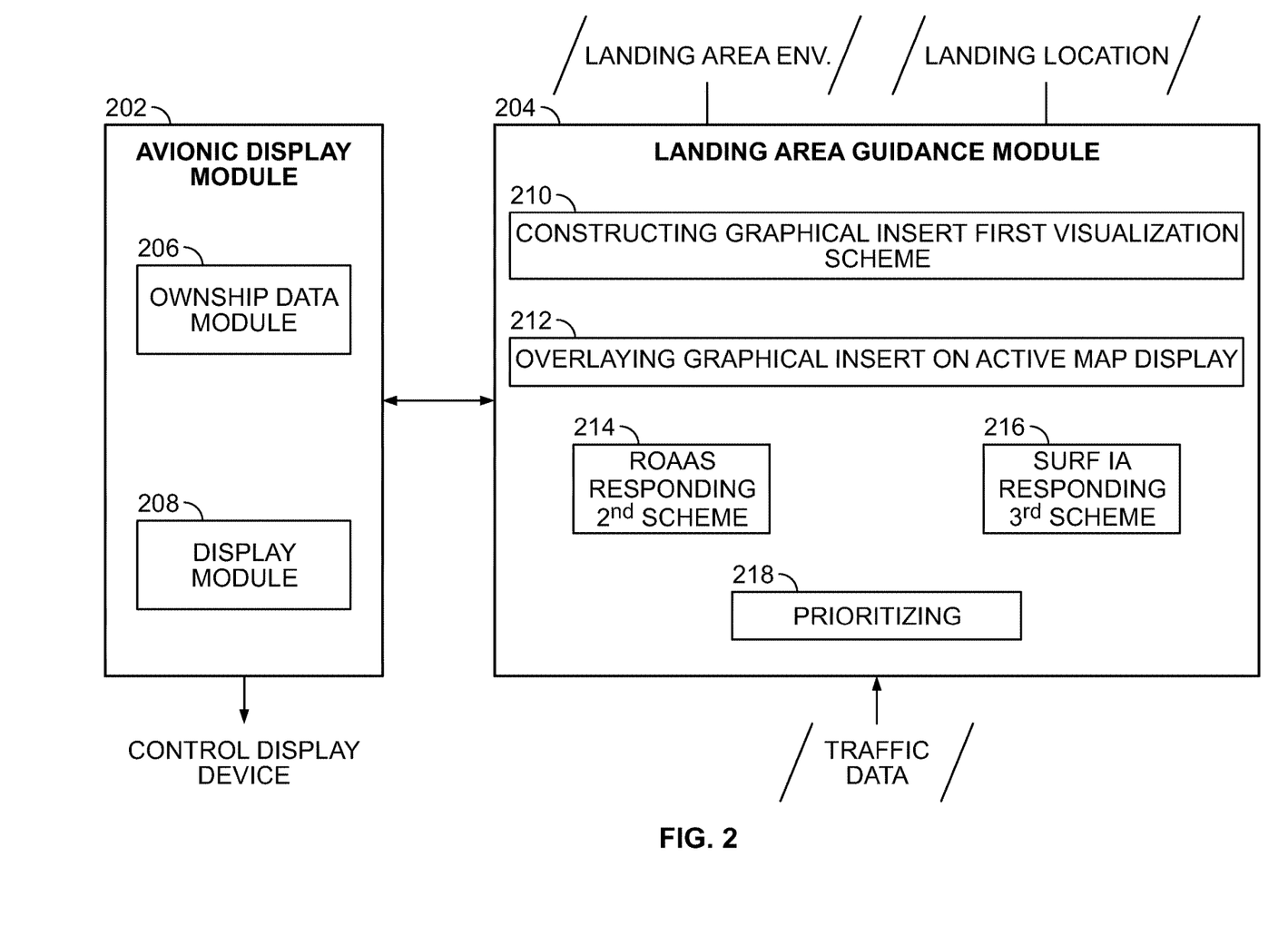
FIG. 2 is an architectural block diagram of one or more application modules that may be operating in the system shown in FIG. 1, in accordance with an exemplary embodiment of the present disclosure.

Turning now to FIGS. 2-5, and with continued reference to FIG. 1, construction and presentation of the graphical insert is further described. FIG. 2 provides an architectural block diagram of one or more application modules that may be operating in the system 10. In various embodiments, the applications modules may be embodied as blocks of hardware or software programming instructions, such as program 34. In various embodiments, the system 10 may include an avionic display module 202 and a landing area guidance module 204, that are configured to process the display of an active map display (the avionic display 38) on the display device 14, construction of the graphical insert, overlaying the graphical insert on the active map display, and responding to ROAAS and SurfIA alerts by altering the rendering of the graphical insert as described herein. In other embodiments, one or more modules may operate on separate computing devices. For example, in various embodiments, the avionic display module 202 may be configured to operate on an aircraft 5, and the landing area guidance module 204 may be configured to operate on a mobile device.

In various embodiments, the avionic display module 202 is configured with an ownship data module 206 for receiving or actively acquiring ownship data from the various ownship data sources 20. The avionic display module 202 may also have a display module 208 that is configured to drive the display device 14 to render the avionic display(s) 38 as described, in particular, the active map display, based at least in part on the data from the ownship data sources 20, such as aircraft status data. In various embodiments, the avionic display module 202 is configured to respond to commands from the landing area guidance module 204 to alter the active map display.

Within the landing area guidance module 204, a graphical insert constructor module 210 may be configured to construct the graphical insert (graphical insert 300, 400, and 700) that places the landing location within features that surround it (e.g., with reference to an airport features database 26); this graphical insert depicts the landing area environment as a two-dimensional area that includes the landing location and cause the rendering of the landing location within the landing area environment, using a first visualization scheme. In various embodiments, graphical insert constructor module 210 further processes received traffic data to determine if a neighbor traffic may be traveling on an intersecting runway or taxiway at a relevant time to the aircraft's travel path; accordingly, the graphical insert constructor module 210 determines whether or not to render an intersecting taxiway or runway on the graphical insert, as a function of the traffic data (i.e., as a function of determining that the a neighbor traffic may be traveling on an intersecting runway or taxiway at a relevant time to the aircraft's travel path). In various embodiments, that determination is made by determining that the traffic data indicates a threat to the aircraft caused by a traffic that will be using the intersecting taxiway or runway, and the threat exceeds a preprogrammed threat level. A threat level is generally measured by separation in time or space between the aircraft and the traffic.

Figure 5:
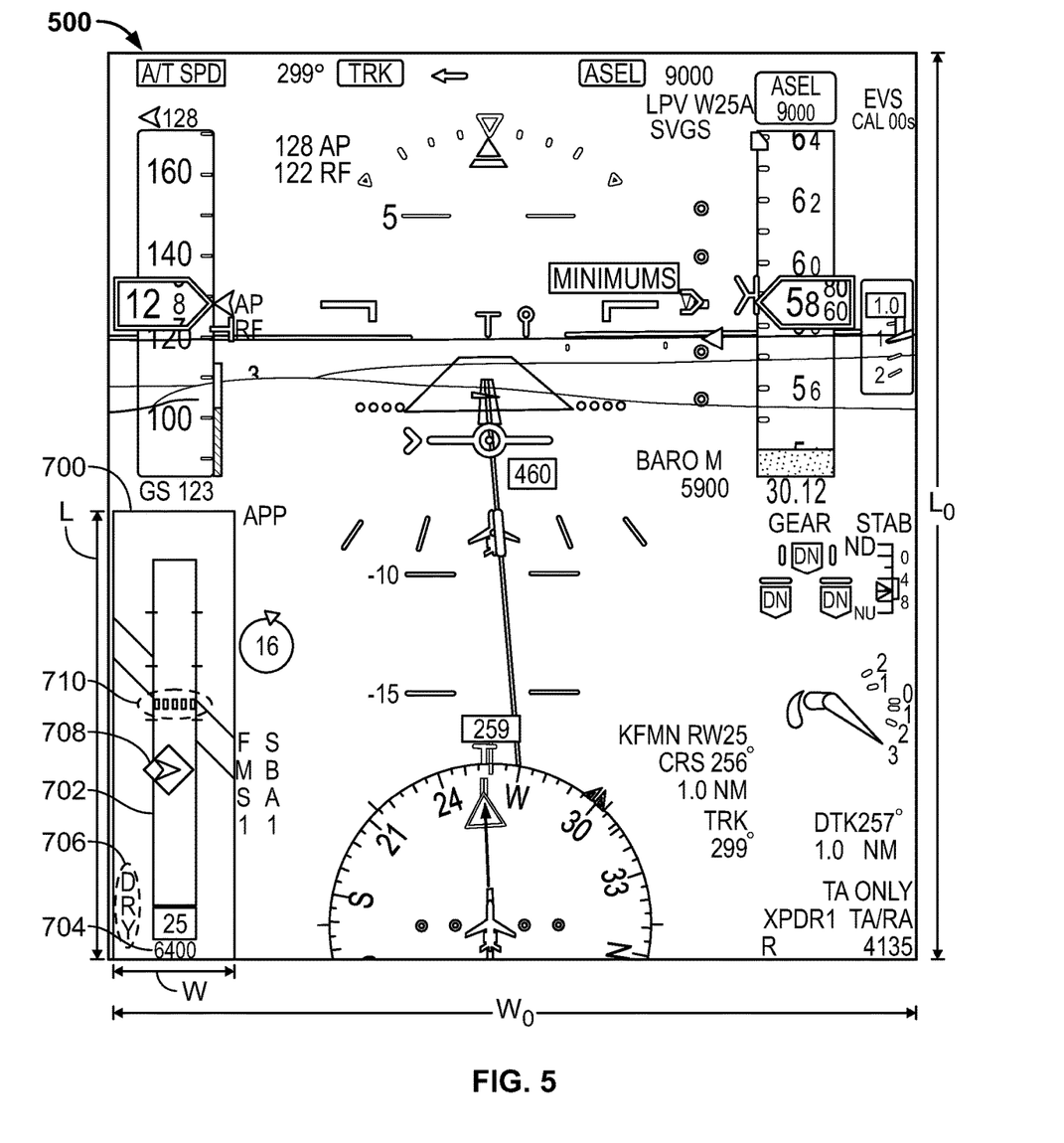
FIG. 5 depicts an active map display with the graphical insert overlaid on it, in accordance with an exemplary embodiment of the present disclosure.

Once constructed, an overlaying module 212 may coordinate overlaying the graphical insert on the active map display. In an embodiment, the overlaying module 212 do this by identifying dimensions of an area of the active map display; e.g., an original width (FIG. 5, Wo) and an original height (FIG. 5, Lo), and then scaling the width and scaling the height by a percentage to arrive at an appropriate "smaller size" for the area of the graphical insert, the smaller size is a predefined portion of the area of the active map display. In various embodiments, the predefined portion means a width of the graphical insert is approximately 20% of Wo and the height of the graphical insert is approximately 50% of the height. Once the dimensions (FIG. 5, L, W) of the graphical insert are determined, the overlaying module 212 may further align the graphical insert. In an embodiment, the overlaying module 212 aligns a bottom-left corner of the graphical insert with a bottom left corner of the active map display (as shown in FIG. 5, 500). In various embodiments, the first visualization scheme includes depicting the landing location as a rectangle of a first color, with a border of a contrasting color from the first color.

Figure 3:
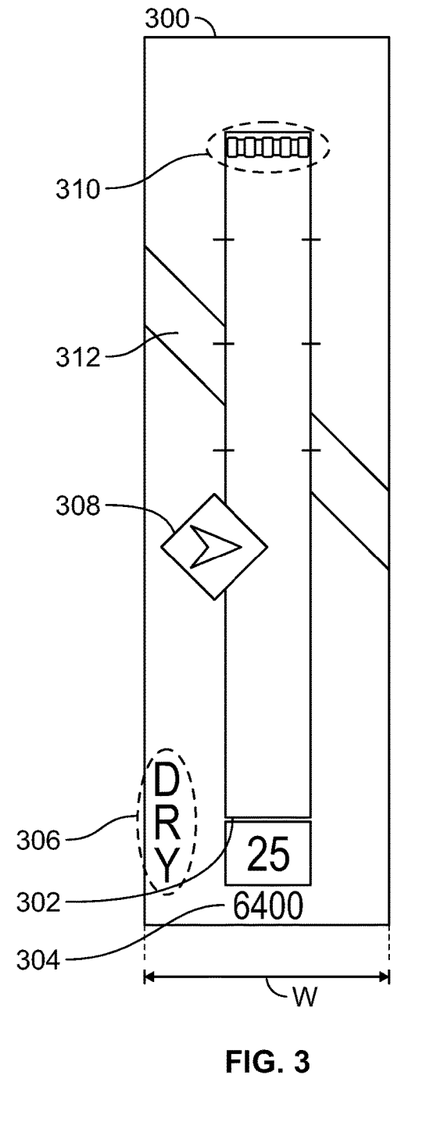
FIGS. 3-4 depict embodiments of the graphical insert constructed, in accordance with an exemplary embodiment of the present disclosure.
Figure 4:
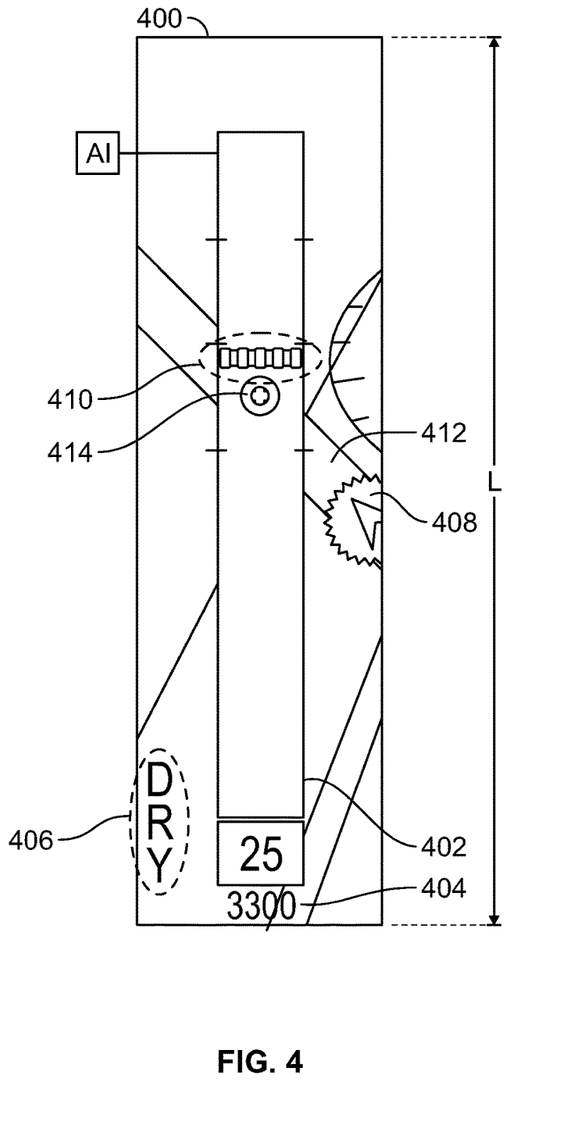

With reference to FIGS. 3-5, and with continued reference to FIG. 2, the graphical insert 300 and graphical insert 400 are described (each having dimensions L, W, as described). Runway 302 is rendered, centered within the dimensions L, W. The area around the runway 302, and the runway 302 itself, is the landing area environment. The runway identification 25 is indicated. The runway is indicated as dry at 306.

ROAAS elements are indicated, including the distance remaining 6400 feet (304), and the runway Landing threshold 310. SurfIA elements are indicated, including a traffic 308, crossing the runway 302 from left to right. An intersecting runway 312 is indicated. As mentioned, in some embodiments, the controller circuit 12 may omit rendering the intersecting runway 312 in the graphical insert 300 when there isn't a traffic using it at a relevant time.

A ROAAS responding module 214 may be configured to, responsive to a ROAAS alert, (i) alter the rendering of the landing location to a second visualization scheme that is visually distinguishable from the first visualization scheme, and (ii) render respective ROAAS elements on the landing location within the landing area environment. The ROAAS responding module 214 may include the ROAAS visualization scheme rules. FIG. 4 depicts an example of the controller circuit 12 employing ROAAS visualization scheme rules. Responsive to the ROAAS alert, the controller circuit 12 may alter the rendering of the landing location e.g., by altering a border of the landing location (runway 302) to a different color than it was in the first visualization scheme, e.g., to flash red, and may further alter the rendering of the landing location by flashing the identifier of the runway 302, e.g., flashing it in red. Responsive to a ROAAS alert, a ROAAS elements are also rendered in the landing area environment, for example, the current stopping location is indicated with a donut symbol 414, and the runway 402 is indicated to be at 3300 feet (404) remaining distance from the aircraft. The conditions at the runway 402 are dry 406. FIG. 4 additionally depicts a target exit from the landing location, A1, as identified by the controller circuit 12.

A SurfIA responding module 216 may be configured to, responsive to a SurfIA alert, indicate a traffic in the landing area environment that is associated with the SurfIA alert with a third visualization scheme associated with SurfIA system (e.g., the symbology for traffic). The SurfIA responding module 216 may include the SurfIA visualization scheme rules. In an example of employing the SurfIA visualization scheme rules, responsive to a SurfIA warning alert, the controller circuit 12 may render the respective traffic symbol within the window and enclose it within a shape, such as a square, that is rendered in a highlighted color representing a warning level of the SurfIA alert. As shown in FIG. 4, traffic 408 is identified as being on intersecting runway 412 (i.e., as shown runway 412 intersects with runway 402 just below runway threshold 410), and the symbol for traffic 408 is rendered with a jagged (or, alternatively, a dashed) boundary to indicate that it is off the scale of the landing environment depicted in the graphical insert.

Wherein ROAAS alerts and SurfIA alerts are collectively called alerts, the prioritization module 218 may be configured to determine whether multiple alerts are occurring; and, when multiple alerts are occurring, assign a priority to each alert of the multiple alerts by comparing a respective safety level/alert ranking of each alert, and rendering one or more of multiple alerts in the landing area environment in accordance with an assigned priority. In an embodiment, the prioritization module 218 may first normalize a ROAAS priority scheme (e.g., green, cyan/white, amber, red) with a SurfIA priority scheme (e.g., traffic rendered cyan or white for low priority, traffic rendered yellow for a 30 second warning, and traffic rendered red for a 15 second warning) so that they are on a single normalized priority scale. After the normalized priority scale is determined, a priority of each incoming alert of the multiple alerts may be assigned based on the normalized priority scale. The prioritization module 218 may further filter the alerts by their assigned priorities, in accordance with a preprogrammed threshold, to identify one or more of the multiple alerts to render on the graphical insert. In an example, a SurfIA warning alert (yellow) may be a higher priority than a ROAAS caution (amber).

In various embodiments, alerts from ROAAS and/or SurfIA are indicated even if not within the landing area environment of the graphical insert. For example, when a distance remaining to land indication is beyond the display provided in the graphical insert, the controller circuit 12 may indicate it as a caged or ghosted symbol. In another embodiment, if a traffic is coming onto an intersecting runway from outside of the landing area environment provided by the graphical insert, the controller circuit 12 may indicate its position, orientation, and a threat level within the graphical insert by displaying the SurfIA traffic symbol using the jagged or dashed symbology described above. In an embodiment, the threat level equates with a high assigned priority on the normalized priority scale.

In FIG. 5, primary flight display 500 is generally centered on the aircraft 5. Graphical insert 700, constructed by the controller circuit 12, is overlaid in the bottom left of the active map display 500. Runway 702 is indicated at 6400 feet remaining distance (704); the runway is indicated as dry at 706. ROAAS landing threshold 710 is indicated. SurfIA traffic is indicated at 708, crossing the runway 702 from left to right. An intersecting runway 712 is indicated. As mentioned, in some embodiments, intersecting runway 712 would be omitted from the graphical insert 700 because there isn't a neighbor traffic using it at a relevant time.

Figure 6:
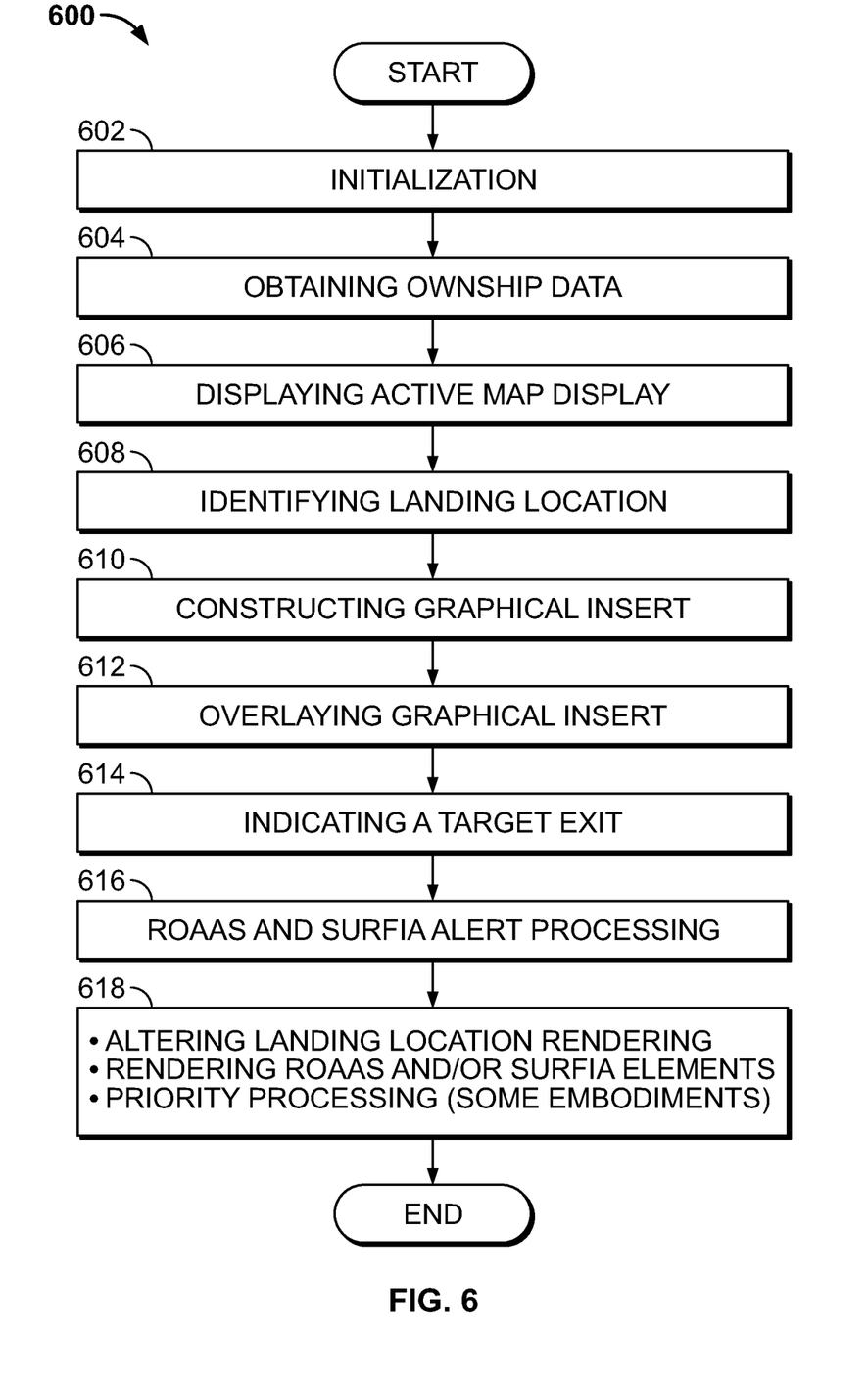
FIG. 6 is a flow chart of a method for providing landing area information on an active map display on a display device in a cockpit of an aircraft, as may be implemented by the system of FIG. 1, in accordance with an exemplary embodiment of the present disclosure.

Turning now to FIG. 6, the system 10 described above may be implemented by a processor-executable method 600 providing landing guidance for an aircraft. For illustrative purposes, the following description of method 600 may refer to elements mentioned above in connection with FIG. 1. In practice, portions of method 600 may be performed by different components of the described system. It should be appreciated that method 600 may include any number of additional or alternative tasks, the tasks shown in FIG. 6 need not be performed in the illustrated order, and method 600 may be incorporated into a more comprehensive procedure or method having additional functionality not described in detail herein. Moreover, one or more of the tasks shown in FIG. 6 could be omitted from an embodiment of the method 600 as long as the intended overall functionality remains intact.

At 602, the system 10 is initialized. Initialization may include loading instructions and program 34 into a processor 30 within the controller circuit 12, as well as loading at least one visualization scheme 36. In various embodiments, the system 10 is already initialized and the method proceeds directly to 604. At 604, the system 10 is obtaining ownship data and at 606, the system 10 is displaying the active map display 38 showing the aircraft 5 at its current location and with its current trajectory. At 606, the system 10 may be receiving traffic data 50 also.

At 608, the system 10 identifies the landing location. As mentioned above, this may be via input over the communication bus, such as provided by an FMS, or it may be input from a user via the user interface 18. At 610, the graphical insert is constructed. Constructing the graphical insert includes determining the L, W dimensions for the graphical insert, as well as rendering the landing location inside it. At 612, the system overlays the graphical insert on the active map display. At 614, the system indicates a target exit on the landing location. At 616, any ROAAS and SurfIA alerts are received and processed. Therefore, at 616, the method is determining whether a runway overrun awareness alerting system (ROAAS) alert has been received; and is determining whether a surface indication alerts (SurfIA) alert has been received. Accordingly, at 616, received traffic data 50 is processed. At 618, responsive to a ROAAS alert, the landing location rendering is altered and ROAAS elements are displayed. At 618, responsive to a SurfIA alert, indicating a traffic associated with the SurfIA alert using SurfIA visualization rules. At 618, in embodiments that have priority processing of multiple alerts (described above), the priority processing is performed, and the landing environment is altered in accordance with the priority processing. After 618, the method 600 may end or return to 616.

Thus, enhanced aircraft guidance systems and methods providing landing area information on an active map display on a display device in a cockpit of an aircraft are provided. The provided methods and systems provide an objectively improved human-machine interface with an easily comprehensible graphical insert overlaid on the active map display. The provided enhanced features provide a user with increased confidence about the surroundings during landing operations.

Although an exemplary embodiment of the present disclosure has been described above in the context of a fully-functioning computer system (e.g., system 10 described above in conjunction with FIG. 1), those skilled in the art will recognize that the mechanisms of the present disclosure are capable of being distributed as a program product (e.g., an Internet-disseminated program or software application) and, further, that the present teachings apply to the program product regardless of the particular type of computer-readable media (e.g., hard drive, memory card, optical disc, etc.) employed to carry-out its distribution.

Terms such as "comprise," "include," "have," and variations thereof are utilized herein to denote non-exclusive inclusions. Such terms may thus be utilized in describing processes, articles, apparatuses, and the like that include one or more named steps or elements but may further include additional unnamed steps or elements. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A system for providing landing area information on an active display on a display device in a cockpit of an aircraft, the system comprising:

a database having data stored therein that is indicative of a landing area environment;

a runway overrun awareness alerting system (ROAAS) configured to supply at least ROAAS elements and ROAAS alerts;

a surface indication alert system (SurfIA) configured to supply SurfIA elements and SurfIA alerts;

a traffic data source configured to supply of traffic data; and a controller circuit in operable communication with the database, the SurfIA, and the traffic data source, the controller configured to receive the ROAAS elements and alerts, the SurfIA elements and alerts, the landing area environment, and the traffic data, the controller circuit configured by non-transitory programming instructions to:

identify a landing location;

construct a graphical insert that depicts the landing area environment as a two-dimensional area that includes the landing location rendered therein in a first visualization scheme;

overlay the graphical insert on a predefined portion of the active display;

indicate a target exit on the landing location;

responsive to a ROAAS alert, (i) alter the rendering of the landing location to a second visualization scheme that is visually distinguishable from the first visualization scheme, and (ii) render respective ROAAS elements on the landing location within the landing area environment; and responsive to a SurfIA alert, indicate traffic symbols in a third visualization scheme associated with a traffic in the SurfIA alert on the landing area environment.

2. The system of claim 1, wherein ROAAS alerts and SurfIA alerts are collectively called alerts, and the controller circuit is further configured to:

determine whether multiple alerts are occurring; and when multiple alerts are occurring, assign a priority to each alert of the multiple alerts by comparing a respective alert ranking of each alert, and apply a visualization scheme that renders one or more of multiple alerts in the landing area environment in accordance with their priority.

3. The system of claim 2, wherein the landing area environment is part of an airport, the landing location is a runway, and wherein the controller circuit is further configured to flash a runway identifier responsive to a ROAAS alert.

4. The system of claim 1, wherein the first visualization scheme includes rendering a border in a first color and rendering a fill in a second color that is visually distinguishable from the first color, and wherein the second visualization scheme includes rendering the border in a third color.

5. The system of claim 1, wherein the landing area environment includes indications of intersecting runways and taxiways to the landing location.

6. The system of claim 1, wherein the source of traffic data is an automatic-dependent surveillance broadcast (ADS-B) system.

7. The system of claim 1, wherein the source of traffic data is a ground-based traffic broadcasting system.

8. The system of claim 1, wherein the target exit on a landing location is identified via a user input received from a user interface.

9. The system of claim 1, wherein the display device is a head up display.

10. The system of claim 1, wherein the display device is a head down display.

11. A method for providing landing area information on an avionic display on a display device in a cockpit of an aircraft, the method comprising:
at a controller circuit,
receiving ownship data;
displaying an avionic display on a display device;
identifying a landing location;
constructing a graphical insert that depicts a landing area environment as a two-dimensional area that includes the landing location rendered therein in a first visualization scheme;
overlaying the graphical insert on the avionic display;
indicating a target exit on the landing location;
determining whether a runway overrun awareness alerting system (ROAAS) alert has been received;
determining whether a surface indication alerts (SurfIA) alert has been received;
responsive to the ROAAS alert, altering the rendering of the landing location and displaying ROAAS elements; and
responsive to the SurfIA alert, indicating a traffic associated with the SurfIA alert using SurfIA visualization rules.

12. The method of claim 11, wherein ROAAS alerts and SurfIA alerts are collectively called alerts, and further comprising, at the controller circuit:
determining whether multiple alerts are occurring; and
when multiple alerts are occurring, assigning a priority to each alert of the multiple alerts; and
rendering one or more of multiple alerts in the landing area environment in accordance with the assigned priority.

13. The method of claim 12, wherein the landing area environment is part of an airport, and the landing location is a runway.

14. The method of claim 13, further comprising rendering the runway with a red border and flashing a runway identifier responsive to the ROAAS alert.

15. The method of claim 12, further comprising:
normalizing a ROAAS priority scheme with a SurfIA priority scheme into a normalized priority scale; and
wherein the priority of each incoming alert of the multiple alerts is assigned based on the normalized priority scale.

16. The method of claim 15, further comprising:
determining that a traffic currently outside of the landing area environment is coming onto an intersecting runway; and
indicating its position, orientation, and a threat level within the graphical insert by displaying a SurfIA traffic symbol within a jagged boundary.

17. The method of claim 16, further comprising, receiving traffic data from an automatic-dependent surveillance broadcast (ADS-B) system.

18. The method of claim 16, further comprising, receiving traffic data from a ground-based traffic broadcasting system.

19. A system for providing landing area information on an avionic display on a display device in a cockpit of an aircraft, the system comprising:
an avionic display module configured by programming instructions to render an avionic display on a display device; and
a landing area guidance module configured by non-transitory programming instructions to:
construct a graphical insert that is smaller than the avionic display, the graphical insert depicting the landing area environment as a two-dimensional area that includes a landing location rendered therein in a first visualization scheme;
overlay the graphical insert on a predefined portion of the avionic display;
indicate a target exit on the landing location;
determine whether a runway overrun awareness alerting system (ROAAS) alert has been received;
determine whether a surface indication alerts (SurfIA) alert has been received;
responsive to the ROAAS alert, alter the rendering of the landing location and display ROAAS elements; and
responsive to the SurfIA alert, indicate a traffic associated with the SurfIA alert using SurfIA visualization rules.

20. The system of claim 19, wherein ROAAS alerts and SurfIA alerts are collectively called alerts, and wherein the landing area guidance module configured by programming instructions to:
determine whether multiple alerts are occurring; and
when multiple alerts are occurring, assign a priority to each alert of the multiple alerts; and
render one or more of multiple alerts in the landing area environment in accordance with the assigned priority.

* * * * *